United States Patent [19]

Akerson

[11] 4,073,230
[45] Feb. 14, 1978

[54] METHOD FOR EMBOSSING MINERAL FIBER BOARD

[75] Inventor: David Wallace Akerson, St. Paul, Minn.

[73] Assignee: Conwed Corporation, St. Paul, Minn.

[21] Appl. No.: 734,326

[22] Filed: Oct. 20, 1976

[51] Int. Cl.² ............................................. B44C 1/24
[52] U.S. Cl. ......................................... 101/32; 101/21
[58] Field of Search ...................... 101/3, 9, 12, 17, 18, 101/21, 32; 162/224, 225, 117, 206; 264/284

[56] References Cited

U.S. PATENT DOCUMENTS

| | | |
|---|---|---|
| 2,551,005 | 5/1951 | Johnson ............................ 101/32 X |
| 2,703,463 | 3/1955 | McElroy ............................ 101/32 X |
| 2,803,188 | 8/1957 | Duvall ................................. 101/32 |

*Primary Examiner*—Ralph T. Rader
*Attorney, Agent, or Firm*—Eyre, Mann, Lucas & Just

[57] ABSTRACT

A method for surface embossing mineral fiber sheets, comprising mineral fibers, perlite and binders, is disclosed. A liquid, preferably water, is sprayed on the surface of the board to be embossed and the wet surface is compressed at an elevated temperature of from 550° to 750° F for about 0.1 to about 2 seconds. The elevated temperature rapidly forms steam which penetrates the sheet surface to be embossed by the simultaneous application of pressure.

3 Claims, 1 Drawing Figure

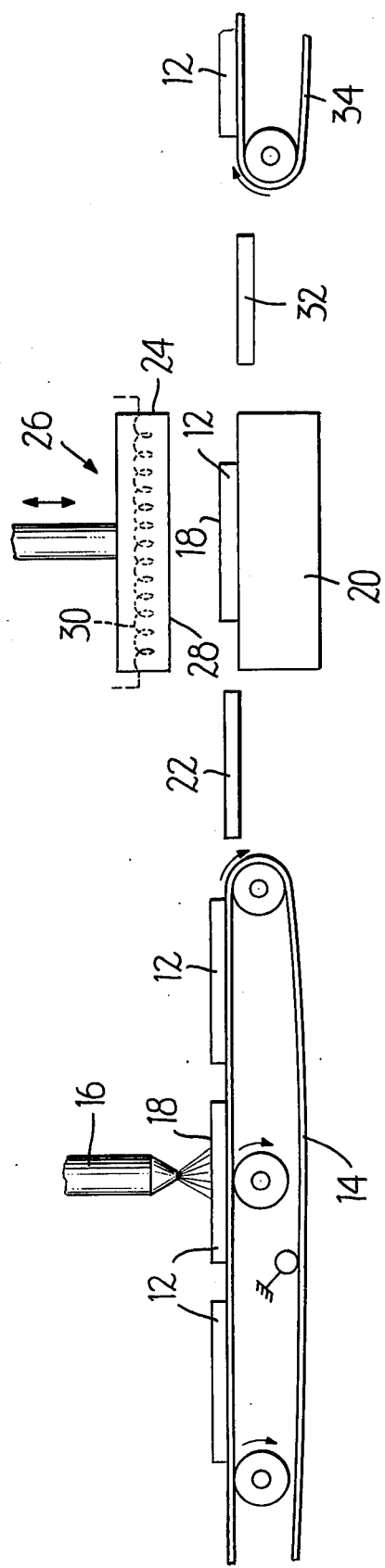

METHOD FOR EMBOSSING MINERAL FIBER BOARD

The invention disclosed herein relates to surface embossing of mineral fiber sheets.

In known methods of surface embossing mineral fiber sheets, steam is caused to penetrate the surface of the board to be embossed to soften the fiber binder, and pressure is then applied for a period of several seconds by a die member having the desired design on its surface. It is also known to spray the surface of the board to be embossed with water and then simultaneously press the board at a temperature of at least 212° F to form the steam with sufficient pressure to form the embossing. One such method is disclosed in U.S. Pat. No. 2,803,188 assigned to the assignee herein and is directed to the surface embossing of cellulosic fiber board. In such known systems for embossing mineral fiber board sheets in which the board surface is wetted with water and then simultaneously heated and pressed, temperatures of about 400° F are used with a press time of 4 or more seconds. These known methods for embossing fiberboard sheets are thus necessarily slow.

The present invention is concerned with the embossing of sheets composed of mineral fibers. Mineral fiber sheets according to the present invention have a thickness of 1/16 to 2 inches, a density of from about 15 to 30 lbs. per cubic foot and are composed of:

(a) from about 75 to about 85% by weight mineral material, said mineral material being composed of:
  (i) from about 20 to about 85% mineral fibers;
  (ii) from 0 to about 50% perlite;
  (iii) from 0 to about 10% of other mineral materials;
(b) from about 15 to about 25% of a binding system, said binding system being composed of:
  (i) from about 5 to about 15% by weight cellulosic fibers;
  (ii) from about 10 to about 20% of a re-activatable binding agent.

A re-activatable binding agent is defined as one in which the binder may be made to set more than one time upon the application of heat and moisture or the like.

The surface of the mineral fiber sheets which are to be embossed are sprayed with a liquid, preferably water. The amount of water to be applied is suitably from about 7 to about 15 pounds per thousand square feet of board surface, and preferably from about 8 to about 10 pounds per thousand square feet. The wetted board is subsequently subjected to a pressure of from about 50 pounds per square inch to about 100 pounds per square inch at a temperature of from about 550° to about 750° F for up to about 2 seconds by a die having the desired embossing configuration on its pressure-applying surface. The combination of heat and pressure causes the liquid to be vaporized (steam in the case of water) which penetrates the sheet surface to soften the binder material in the sheet. The softened surface is in turn deformed by the pressure from and heat of the die surface. The board is subsequently cooled and the binder reset. One would expect a linear inverse time temperature relationship, i.e., for each halving of the time, a doubling of the temperature would be required in order to achieve the same embossing results. The applicant has, quite surprisingly, discovered that such a relationship does not exist with mineral fiber sheets having the specific composition herein specified, and that only 550° to 750° F is required to emboss the surface of mineral fiber hardboard with a press time of only ½ second. This is a reduction in time by ⅛ which, according to the expected linear inverse time-temperature relationship, would require a temperature increase of 8/1 or 800%. However, according to the invention, and quite unexpectedly, an increase in temperature of only about 0.4 to 1.0 (40 to 100%) is required.

These and other aspects of the present invention will be more apparent from the following detailed description of the invention when considered in conjunction with the single FIGURE of the accompanying drawing which illustrates the invention and in which a process for surface embossing of mineral fiber board sheets is diagrammatically shown.

Referring to the FIGURE, mineral fiber board sheets 12 are moved on conveyor 14. The sheets 12 will normally be from about ⅛ to about 2 inches in thickness and will have a density of from about 15 to about 25 pounds per cubic foot. The surface area size of the sheets may vary but will normally be about 1 × 1 ft., 2 × 2 ft., and 2 × 4 ft. The composition by weight of the mineral board sheets is as follows:

mineral fibers — from about 20 to about 85%
perlite — from 0 tp 50%
other mineral materials — from 0 to about 10%
binders — from about 15 to about 25%

The sheets, advanced by conveyor 14, are passed under liquid dispenser 16 which sprays the surface 18 to be embossed with a suitable liquid, preferably an aqueous solution such as plain water, which will hereafter be used for purposes of illustration. The surfaces 18 of sheets 12 are thereby moistened. The amount of water used is from about 8 to about 10 pounds per 1,000 square feet of sheet surface. The moistened sheets are then transferred to stationary press platen 20 by member 22 in known manner. Upper platen 24 of crank operated reciprocating press 26 is reciprocated to press sheets 12 between it and stationary platen 20, the desired embossing pattern being in the die pressing surface 28 of platen 24. The die pressing surface 28 of platen 24 is heated to from about 550° to about 750° F by known means such as, for example, suitably positioned electrical elements 30 connected to a source of electrical power (not shown). The sheets 12 are pressed for at least about 0.1 second. The combination of heat and pressure causes the moisture to turn to steam, penetrate the sheet surface 18, and soften the binders and material in the uppermost portion of the sheet so that it can be embossed by the die pattern 28 without damaging the sheet itself. With a platen temperature range of from about 550° to about 750° F for most types of mineral fiber board, not more than about two seconds of press time is required. After a pressing time of from about 0.1 to about 2 seconds, platen 24 is reciprocated to disengage the sheet 12, which is then removed from the stationary platen 20 by member 32 to conveyor 34 to be cooled and the binder reset.

In a reciprocating die press system of the type described hereinbefore, a cycling rate of about 10 to 120 cycles per minute is required to achieve the 0.1 to 2 seconds pressing time. It will be understood that the detailed structure of such systems including the conveying means and the press are known to those skilled in the art and that detailed description thereof is not necessary herein. It should also be understood that many hydraulic systems are not amenable to cycling times as fast as 30 cycles per minute and that reciprocating cam operated systems can be used if desired. Other means than the diagrammatically shown conveyors 14 and 34, sprayer 16, and members 22 and 32 may be used to feed to and remove sheets from the press 26. These means will be apparent to those skilled in the art as well as other presses than the one diagrammatically shown. Heating means other than electrical will also be apparent to those skilled in the art, e.g., a flow of heated water. Although embossing of only one side of the sheets has been illustrated, it should be understood that both sides may be simultaneously or sequentially embossed using the present invention. For example, liquid may be simultaneously sprayed on both sides of the sheet, and platen 20 may contain a heated embossing die member.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purpose of the disclosure without departing from the spirit and scope of the invention.

What is claimed is:

1. Method for embossing mineral fiber sheet wherein said sheet is composed of:
   (a) from about 75 to about 85% by weight mineral material, said mineral material being composed of:
      (i) from about 20 to about 85% mineral fibers;
      (ii) from 0 to about 50% perlite;
      (iii) from 0 to about 10% of other mineral materials;
   b. from about 15 to about 25% of a binding system, said binding system being composed of:
      (i) from about 5 to about 15% by weight cellulosic fibers;
      (ii) from about 10 to about 20% of a reactivatable binding agent;
   (c) said sheet having a thickness of from about ½ inch to about 2 inches and a density of from about 15 pounds to about 25 pounds:

said method comprising the steps of wetting at least one side of the sheet surface with from about 7 to about 15 pounds of water per thousand square feet of board surface and thereafter positioning the sheet on a stationary platen subjecting the sheet surface to treatment with a stationary reciprocating press having a design forming member having a temperature of from about 550° to about 750° F and said design forming member being applied for a period of from about 0.1 seconds to about 2 seconds at a pressure sufficient to deform the surface whereby a permanently embossed pattern is obtained on the surface of the mineral fiber sheet.

2. Method according to claim 1, wherein the board surface is wet by the application thereto of from about 8 to 10 pounds per 1000 square feet of board surface.

3. Method according to claim 1, wherein the pressure applied is from about 50 to about 100 pounds per square foot.

* * * * *

UNITED STATES PATENT AND TRADEMARK OFFICE
CERTIFICATE OF CORRECTION

PATENT NO. : 4,073,230
DATED : February 14, 1978
INVENTOR(S) : David Wallace Akerson It is certified that error appears in the above-identified patent and that said Letters Patent are hereby corrected as shown below:

Column 2, line 25, "tp" should read --to about--.

[SEAL]

Signed and Sealed this

Twenty-fifth Day of July 1978

Attest:

RUTH C. MASON
Attesting Officer

DONALD W. BANNER
Commissioner of Patents and Trademarks